Patented Aug. 3, 1954

2,685,591

UNITED STATES PATENT OFFICE 2,685,591

1-DIPHENOYLAMINO-6-FLUORANTHRA-QUINONE

Walter Jenny, Reinach, and Walter Kern, Sissach, Switzerland, assignors to Ciba Limited, Basel, Switzerland, a Swiss firm No Drawing. Application July 30, 1951, Serial No. 239,401

Claims priority, application Switzerland July 31, 1950

5 Claims. (Cl. 260—372)

According to this invention valuable new anthraquinone vat dyestuffs are made by condensing 1-amino-6-fluoranthraquinone with a halide of a diphenyl-monocarboxylic acid or by condensing 1-chloro-6-fluoranthraquinone with the amide of a diphenyl-monocarboxylic acid.

The 1-chloro-6-fluoranthraquinone used as starting material in the second form of the process described above can be prepared from 2-fluoranthraquinone by sulfonating the latter with the addition of a mercury salt, separating 6-fluoranthraquinone-1-sulfonic acid from the sulfonation mixture, which also contains some 7-fluoranthraquinone-1-sulfonic acid, and treating the 6-fluoranthraquinone-1-sulfonic acid with sodium chlorate. By condensing the resulting 1-chloro-6-fluoranthraquinone with an aromatic sulfonamide and then hydrolysing the 1 - aryl - sulfonylamino - 6 - fluoranthraquinone there is obtained 1-amino-6-fluoranthraquinone, which is used as starting material in the first form of the process described above.

If desired, there may alternatively be used in the above process the anthraquinones substituted in the 1- and 6-positions as described above, which contain as by-products up to 45 per cent of the corresponding 1:7-isomers but mostly considerably less. These starting materials of non-unitary composition are obtained by refraining from separating or by incompletely separating the 7-fluoranthraquinone-1-sulfonic acid from the 6-fluoranthraquinone-1-sulfonic acid in the reaction mixture resulting from the sulfonation of 2-fluoranthraquinone. The manufacture of 1-amino-6-fluoranthraquinone according to the above mentioned method is the object of our copending application Serial No. 239,402, filed on even date herewith.

The functional derivatives of diphenyl-monocarboxylic acids to be condensed with the anthraquinone compounds in the present process may, if desired, contain further substituents of the kind usual in vat dyestuffs, for example, lower alkyl groups, especially ethyl or methyl groups, halogen atoms, especially a chlorine atom, or sulfone groups, for example, a methyl sulfone group. It is of advantage to use the functional derivatives of diphenyl-4-carboxylic acids. Thus, for example, there may be used as starting material the amide or a halide, advantageously the chloride, of 4'-methyl-1:1'-diphenyl-4-carboxylic acid or 1:1'-diphenyl-4-carboxylic acid - 4' - methylsulfone. Especially valuable is the amide or a halide, above all the chloride, of diphenyl-4-carboxylic acid itself, which, on the one hand, are the simplest compounds of this kind, and on the other lead to dyestuffs having especially valuable properties.

The condensations of the present process may be carried out by methods in themselves known advantageously in a high boiling organic solvent such as nitrobenzene or orthodichlorobenzene and at a raised temperature. In the condensation of 1-chloro-6-fluoranthraquinone with the diphenyl-monocarboxylic acid amides it is recommended to add to the reaction mixture an acid-binding agent, for example, sodium carbonate or potassium carbonate and also the copper salt such as cuprous acetate or cuprous bromide.

The new anthraquinone vat dyestuffs obtainable by the present invention correspond to the formula

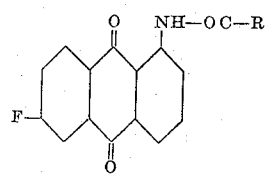

in which R represents a diphenyl radical, which is preferably bound it its 4-position to the -OC- group.

The vat dyestuffs of the above constitution yield in general valuable pure yellow tints and are distinguished from the corresponding known dyestuffs, which lack the fluorine atom, generally by a stronger absorption capacity or more intense tint, and from the corresponding partially known dyestuffs, in which a chlorine atom occupies the position of the fluorine atom, by a commercially important shifting of the tint towards green.

The dyestuffs can be used as pigment dyestuffs or for dyeing and printing a very wide variety of fibers, such as linen, cotton and artificial silk or staple fibers of regenerated cellulose, the usual dyeing and printing methods being used. They can also be used in the form of their leuco-ester salts, for example, the sulfuric acid ester salts, by the methods usual for this class of dyestuffs.

The following examples illustrate the invention the parts and percentages being by weight unless otherwise stated and the relationship of parts by weight to parts by volume being the same as that of the kilogram to the liter.

*Example 1*

55 parts of diphenyl-4-carboxylic acid are suspended in 480 parts of dry nitrobenzene after the addition of 36 parts of thionyl chloride, the whole is stirred for 1½ hours at 90–100° C. The whole is then mixed with 48.2 parts of 1-amino-6-fluoranthraquinone and stirred for a further 2 hours at 125–130° C. After cooling, the dyestuff which has precipitated in the form of small yellow crystals is separated by filtering with suction, washed well with boiling alcohol and dried. It is soluble in concentrated sulfuric acid with a brown-red coloration, and dyes cotton from a violet vat strong, extraordinarily pure, greenish yellow tints. The dyestuff is also suitable for printing by the usual potash process.

The 1-amino-6-fluoranthraquinone may be prepared as follows:

93 parts of pure 2-fluoranthraquinone are introduced at 60–65° C. while stirring, into a mixture of 192 parts of oleum containing 24 per cent. of free SO₃ 34 parts of oleum containing 65 per cent. of free SO₃ and 2 parts of mercury sulfate. The temperature is then raised in the course of 1 hour to 125° C. and maintained at 125–130° C. until the sulfonation is complete. The whole is then poured into 3000 parts of warm water, which contains 2 parts of sodium chlorate, and the mixture is then heated to the boil and filtered with suction. The filtrate is mixed hot with about 50 parts of sodium carbonate and allowed to stand at room temperature for 24 hours. The fluoranthraquinone sulfonic acid precipitated in the form of colorless crystals is separated by filtering with suction, and washed with saturated sodium sulfate solution and dried.

A solution of 130 parts of sodium chlorate in 330 parts of water are introduced dropwise at 90–95° C. in the course of 2 hours, while stirring, into a solution of 37 parts of the sodium-2-fluoranthraquinone-5-sulfonate obtained as described above in 3000 parts of water and 240 parts of concentrated hydrochloric acid. Stirring is continued at 90–95° C. until no more chloro-derivative precipitates. The whole is then filtered with suction while hot, and the filter residue is washed with boiling water and dried. The crude 1-chloro-6-fluoranthraquinone can be recrystallized easily from glacial acetic acid, chlorobenzene or ortho-dichlorobenzene. It crystallizes in pale yellow needles and dissolves in concentrated sulfuric acid with an intense yellow coloration.

Analysis: C₁₄H₆O₂ClF,
Chlorine (calculated) 13.62%; fluorine (calculated) 7.29%.
Chlorine (found) 13.65%; fluorine (found) 7.4%.

Practically pure 1-chloro-6-fluoranthraquinone melts at 191–192° C.

A mixture of 200 parts of 1-chloro-6-fluoranthraquinone, 160 parts of para-toluene sulfonamide, 80 parts of anhydrous sodium acetate, 4 parts of copper acetate and 1400 parts of nitrobenzene is slowly heated up to 170° C. The mixture is then stirred for 2 hours at 170–175° C. and then for a further 2 hours at 190–195° C. After cooling, the whole is filtered with suction, and the filter residue is washed well with boiling alcohol and water and dried. The resulting sulfonamide derivative crystallizes from anisole in the form of yellow crystals melting at 259° C.

14 parts of the sulfonamide compound are stirred with 180 parts of concentrated sulfuric acid for 40 minutes at 60–65° C. After pouring the solution into ice water, the whole is filtered with suction, and the filter residue is washed with water until neutral and dried. The resulting red powder can be recrystallized from chlorobenzene or anisole and then forms brilliant red needles, which dissolve in concentrated sulfuric acid with a yellow coloration. The practically pure 1-amino-6-fluoranthraquinone so obtained corresponds to the formula

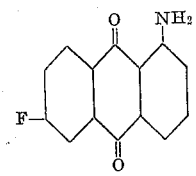

and melts at 208–209° C.

*Example 2*

12 parts of 1-amino-6-fluoranthraquinone and 14 parts of 4'-chloro-1:1'-diphenyl-4-carboxylic acid chloride are stirred for 2 hours at 125–130° C. After cooling, the mixture is filtered with suction to separate the dyestuff which has precipitated in the form of yellow needles, and the filter residue is washed with nitrobenzene and boiling alcohol and dried. It dissolves in concentrated sulfuric acid with a brown-orange coloration, and dyes cotton from a bordeaux red vat pure greenish yellow tints.

By acylating 1-amino-6-fluoranthraquinone with 4' - methyl - sulfone - 1:1' - diphenyl - 4-carboxylic acid chloride, there is obtained a somewhat more weakly dyeing dyestuff having similar properties. 4' - methyl - sulfone - 1:1'-diphenyl-4-carboxylic acid is obtained, for example, from the 4'-sulfochloride by conversion into the sulfinic acid and subsequent methylation.

*Example 3*

14 parts of diphenyl-4-carboxylic acid amide, 17 parts of 1-chloro-6-fluoranthraquinone, 14 parts of potassium carbonate and 14 parts of cuprous bromide are slowly heated in 350 parts of dry ortho-dichlorobenzene up to the boil, while stirring. The suspension is then stirred at the boil for 20 hours, allowed to cool, filtered with suction, and the filter residue is washed with alcohol, hydrochloric acid of 3 per cent. strength and hot water. The gold-yellow powder so obtained may be further purified by treatment with hot glacial acetic acid. It dissolves in concentrated sulfuric acid with a red coloration and dyes cotton from a bordeaux red vat bright greenish yellow tints having good properties of fastness. The dyestuff is also suitable for printing by the usual potash process.

If the reaction between diphenyl-4-carboxylic acid amide and 1-chloro-6-fluoranthraquinone is carried out in a lower boiling suspension medium, it is of advantage to work under raised pressure.

*Example 4*

0.8 part of the dyestuff obtained as described in Example 1, are finely sub-divided, for example, by reprecipitation from a solvent, and vatted in 100 parts of water with the addition of 4 parts by volume of sodium hydroxide solution of 30 per cent. strength and 2 parts of sodium hydrosulfite at about 50° C. The stock vat so prepared is added to a dyebath consisting of 3000 parts of water, 8 parts by volume of sodium hydroxide solution of 30 per cent. strength, and 3 parts of sodium hydrosulfite, and 100 parts of cotton are entered at 25° C. After 15 minutes, 45 parts of sodium chloride are added and dyeing is carried on for 1 hour at 25–30° C. The cotton is then squeezed, oxidized in the air, rinsed in the cold, acidified, again rinsed, and soaped at the boil. The cotton is dyed a pure greenish yellow tint.

What we claim is:

1. An anthraquinone vat dyestuff of the formula

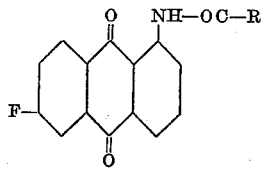

in which R represents a diphenyl radical.

2. An anthraquinone vat dyestuff of the formula

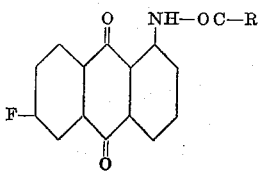

in which R represents a diphenyl radical bound in 4-position to the -CO-group.

3. The anthraquinone vat dyestuff of the formula

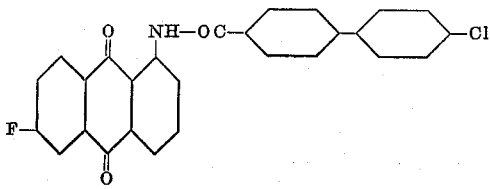

4. The anthraquinone vat dyestuff of the formula

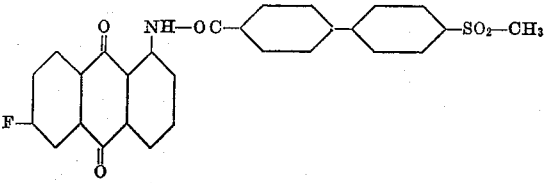

5. The anthraquinone vat dyestuff of the formula

References Cited in the file of this patent

UNITED STATES PATENTS

| Number | Name | Date |
|---|---|---|
| 1,877,791 | Bayer | Sept. 20, 1932 |
| 2,506,025 | Jenny et al. | May 2, 1950 |

FOREIGN PATENTS

| Number | Country | Date |
|---|---|---|
| 371,420 | Great Britain | Apr. 18, 1932 |